United States Patent
Wright

(10) Patent No.: US 7,629,963 B1
(45) Date of Patent: Dec. 8, 2009

(54) METHOD AND APPARATUS FOR BINDING PERIPHERAL DEVICES TO A COMPUTER

(75) Inventor: David G. Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 684 days.

(21) Appl. No.: 11/007,072

(22) Filed: Dec. 7, 2004

Related U.S. Application Data

(60) Provisional application No. 60/531,933, filed on Dec. 22, 2003.

(51) Int. Cl.
G06F 3/02 (2006.01)
G06F 3/00 (2006.01)

(52) U.S. Cl. .............................. 345/168; 345/156; 710/8

(58) Field of Classification Search ................. 713/176, 713/193; 345/156, 168; 710/8–14
See application file for complete search history.

(56) References Cited

U.S. PATENT DOCUMENTS

| | | | | |
|---|---|---|---|---|
| 5,946,469 | A * | 8/1999 | Chidester | 703/24 |
| 6,704,824 | B1 * | 3/2004 | Goodman | 710/300 |
| 6,813,650 | B1 * | 11/2004 | Cato et al. | 710/14 |
| 7,117,374 | B2 * | 10/2006 | Hill et al. | 713/193 |
| 7,395,421 | B1 * | 7/2008 | Nowlin | 713/2 |
| 2004/0122738 | A1 * | 6/2004 | Lum | 705/21 |
| 2004/0193744 | A1 * | 9/2004 | Paley et al. | 710/5 |
| 2005/0044372 | A1 * | 2/2005 | Aull et al. | 713/176 |
| 2007/0035523 | A1 * | 2/2007 | Cohen | 345/169 |

OTHER PUBLICATIONS

M2 Presswire-Aug. 11, 2003-Cambridge Silicon Radio: CSR saves stranded mice; HID Proxy firmware enables Bluetooth keyboard and mouse to work from boot up(C)1994-2003 M2 Communications LTD—retrieved Jul. 6, 2009 from www.accessmylybrary.com by RR.*
Design your own DOS menu system, part II; a customized menu can be created with a DOS batch file. Article from: Computers in Libraries Article date: Nov. 1, 1990 Author: Halkias, Serafim ; Jackson, Stephen—retreived Jul. 6, 2009 from http://www.highbeam.com/DocPrint.aspx?DocId=1G1:9315220 by RR.*

* cited by examiner

*Primary Examiner*—Amare Mengistu
*Assistant Examiner*—Robert R Rainey

(57) ABSTRACT

A non-keyboard computer peripheral device represents itself to a host computer as having a keyboard function in addition to representing its actual function. Keyboard status signals are generated by the host computer in response to a user pressing different keys on an actual keyboard. The peripheral device uses the keyboard status signals to identify different peripheral device operations selected by the user. In one example, a radio receiving device represents itself to the host computer as including the keyboard function. Pressing a button on the receiving device causes the receiving device to send a sequence of keystroke commands to the host computer that cause the host computer to initiate software applications and to display operating instructions to a user. A series of further binding operations are then executed in accordance with the displayed operating instructions.

22 Claims, 6 Drawing Sheets

METHOD AND APPARATUS FOR BINDING PERIPHERAL DEVICES TO A COMPUTER

This application claims priority from U.S. Provisional Application Ser. No. 60/531,933, filed Dec. 22, 2003.

TECHNICAL FIELD

The present invention relates generally to electronic circuits and in particular to wireless peripheral devices that communicate with computers.

BACKGROUND OF THE INVENTION

Wireless communications between peripherals and Personal Computers (PCs) is rapidly growing in popularity. Many wireless systems transfer data in only one direction, from a transmitter to a receiver, but not in the other direction. Examples of such systems include most Human Interface Devices (HIDs), such as mice, keyboards and game controllers. These devices are implemented most cost-effectively with a transmit-only radio, because generally a radio transmitter is much less costly to implement than a receiver.

However, many of these systems are implemented using 2-way wireless links, primarily because of the difficulty of associating a given transmitter with a corresponding receiver without the benefit of a back channel. This difficulty is a result of the uncertain nature of wireless communication. Wireless systems typically have a choice of using multiple channels, in order to allow many transmitter/receiver pairs to operate in the same physical location.

Depending on the type of access scheme used by the wireless system, these channels may use different frequencies, timeslots or codes. For example, wireless devices may use Frequency Division Multiple Access (FDMA), Time Divisional Multiple Access (TDMA), or Code Division Multiple Access (CDMA) channel access. Some frequencies may be subject to interference from other wireless systems or unintentional radiators of Radio Frequency (RF) energy.

The presence of a back channel in a 2-way radio system allows the implementation of automatic channel search algorithms, which enable a group of wireless devices to automatically bind to each other without further intervention after a user initiates the binding process.

One-way radio systems have much less satisfactory binding procedures. A first conventional solution uses channel selector switches. The user sets a switch on both a transmitter and a receiver to the same position, and evaluates whether or not performance is satisfactory. This requires the user to manually test each switch setting, and make an often subjective judgment about the relative quality of the wireless link.

A second conventional solution uses bind buttons where the user presses a bind button on both the transmitter and receiver. The transmitter transmits test data on a first frequency, and the receiver listens for the test data on that first frequency. If the test data is received correctly, the receiver gives basic feedback to the user for example by illuminating a green LED. If no test data is received, or the data contains too many errors, the receiver indicates this by flashing a red LED. In this case, the user then presses the bind button on both transmitter and receiver a second time and the process repeats for another channel. The process may require third, fourth, etc. button presses if the earlier channels do not deliver satisfactory performance.

This solution has found acceptance in 27 MHz wireless Human Interface Device (HID) applications, but is the major cause of product support calls and store returns for such products. The process becomes even more unfriendly if more than one transmitter needs to bind to the same receiver. In this case, the binding process is typically undertaken first with one transmitter, and the user counting the number of iterations performed before binding is successful. The user then has to press the bind button the same corresponding number of times on the second, third, etc wireless devices. If there are more than a small number of channels and devices, this process becomes very cumbersome.

This type of binding procedure is unlikely to be successful in 2.4 GHz wireless devices, that typically have seventy to eighty channels. A large number of wireless channels are necessary due to the presence of wireless Ethernet (WiFi), Bluetooth, cordless phones and other wireless devices that require the availability of many channels in any given location.

If a radio receiver had a more sophisticated user interface than a single bind button and 1 or 2 LEDs, then it might be possible to greatly simplify this process. The transmitter and receiver could test every channel, and the User Interface (UI) on the receiver could display simple step by step instructions which the user could follow to configure each transmitter to use the best channel.

Consumers have also become accustomed to electronic devices which work "out of the box" with little or no user intervention. If user intervention is required, the user expects to be guided through it, step by step, by on-screen instructions. An obvious technique for providing such a user interface in a HID application would be to provide an installation program and driver with the wireless system. The program could run on the host computer display screen and could then guide the user through the process described above. However, this would significantly detract from the "plug and play" ideal of modern Personal Computer (PC) peripherals.

The cost of the Compact Disc (CD) would partially offset the cost benefit of using a 1-way rather than 2-way radio system. In addition, many end-users are accustomed to plugging Universal Serial Bus (USB) devices into their PC, and having them work without installing drivers or software applications. Another problem exists when the user misplaces the CD after initial installation of the wireless system. It would be troublesome if the user then needed to install the wireless system on a different PC.

These are just some of the reasons why wireless HID manufacturers are reluctant to adopt solutions which require the installation of drivers and/or software applications. Such OEMs typically opt to incur the cost of using 2-way wireless systems, rather than incur the inconvenience and product support cost of requiring the end-user to manually install software.

Thus, the complexity of conventional wireless binding schemes lead to product returns and support calls for 1-way wireless HID products. This is very disadvantageous since a single product support call can cost more to service than the total gross margin on the product.

It would be desirable to eliminate some of the disadvantages of conventional binding schemes.

SUMMARY OF THE INVENTION

A non-keyboard computer peripheral device represents itself as a keyboard in addition to representing its actual function. This allows the peripheral device to use keyboard keystroke commands to initiate software applications and display text on a host computer. In another embodiment, keyboard status signals are generated by the host computer in response to a user pressing different keys on an actual keyboard. The peripheral device uses the keyboard status signals to identify different peripheral device operations selected by a user.

In one example, a radio receiving device represents itself to the host computer as including the keyboard function. Pressing a button on the receiving device causes the receiving device to send a sequence of keystroke commands to the host computer that cause the host computer to display operating instructions to a user. A series of further binding operations are then executed in accordance with the displayed operating instructions.

DETAILED DESCRIPTION

Figure 1:
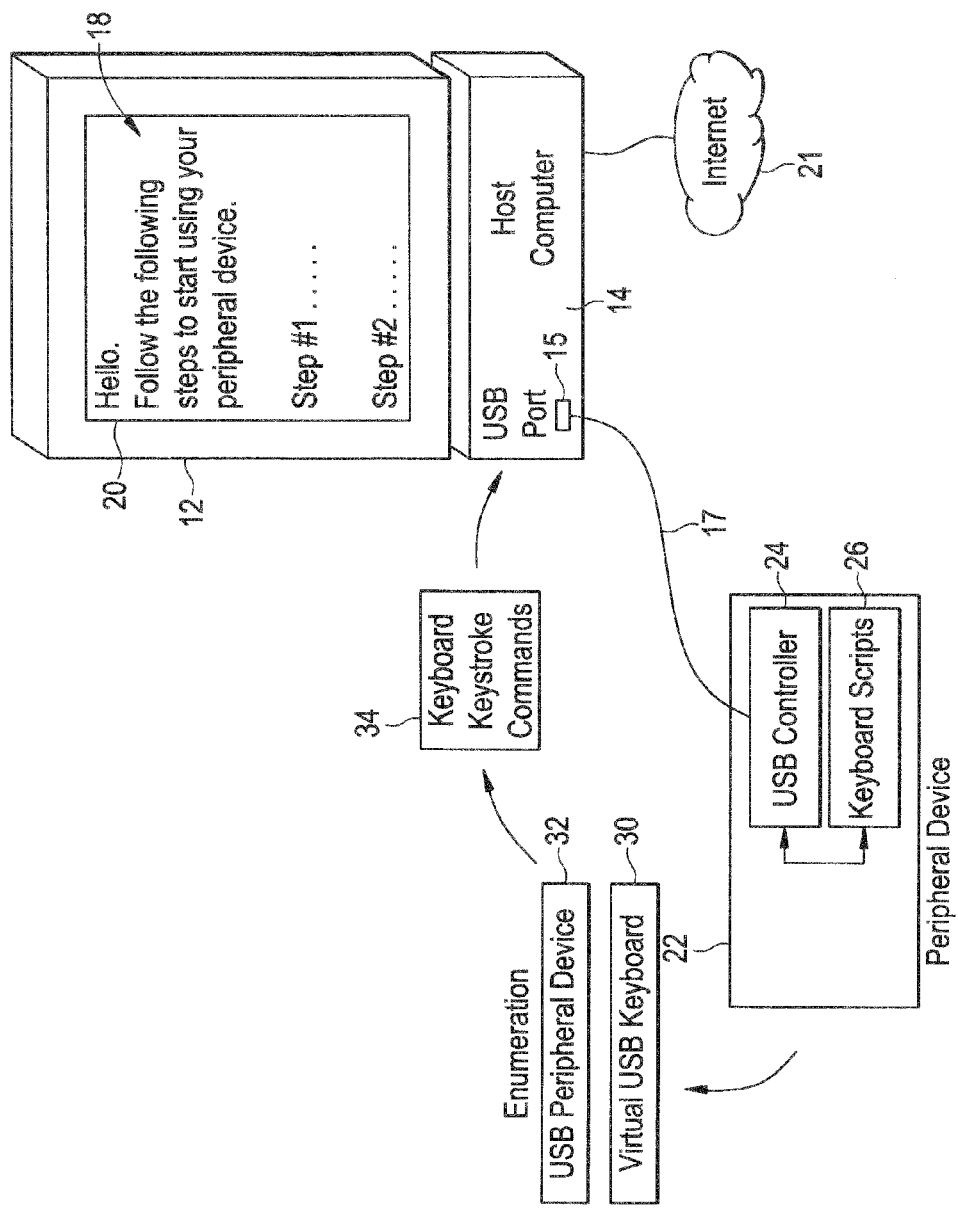
FIG. 1 is a diagram of a communication system used between a host computer and a peripheral device.

FIG. 1 shows a computer system that includes a host computer 14 that is connected to peripheral device 22. The peripheral device 22 in one example is a Universal Serial Bus (USB) peripheral device that is connected to the host computer 14 through a USB port 15. However, the peripheral device 22 can be any device that needs to communicate to a user through host computer 14. For example, the peripheral device 22 can be a game controller, mouse, keyboard, memory, Compact Disc (CD), Digital Video Disc (DVD). The peripheral device 22 includes a USB controller 24 and memory 26.

The host computer 14 can be any computing device, such as a Personal Computer (PC) and includes a computer screen 12, alternatively referred to as a User Interface (UI). The host computer 14 is alternatively referred to as a USB host, PC, or simply as computer 14.

The USB specification provides for USB devices that have multiple functions. The USB controller 24 in peripheral device 22 can enumerate itself to USB host 14 as a "Composite Device", with two interfaces. Assume for example that the peripheral device 22 is a wireless game controller. The peripheral device 22 can enumerate itself to the USB host 14 as a game controller in USB descriptor 32 and also enumerate itself as a keyboard in descriptor 30. The first interface enumerated as the game controller and the second interface enumerated as the keyboard.

The enumeration of the virtual keyboard 30 allows the peripheral device 22 to send and receive keyboard keystroke commands 34 to the host computer 14. These keyboard keystroke commands 34 are used to relay information relating to peripheral device 22 to a user using the screen/User Interface (UI) 12 of host computer 14. For example, the peripheral device 22 can include keyboard keystroke command scripts in memory 26 that are displayed on the UI 12 and explain how to configure, debug, operate, etc. the peripheral device 22.

All versions of the Windows® operating system, including Windows 95® and other computer systems, support various shortcut key combinations activated by use of a <Windows> key, commonly positioned between the <CTRL> and <ALT> keys. Pressing the <Windows> key, followed by the <R> key gives access to a command line interface. All such versions of Windows® also include the old MSDOS editor.

The peripheral device 22 sends the keyboard keystroke commands 34 to the host computer 14 that bring up the command line interface. Additional keyboard keystroke commands 34 are then used to open up a text display window 20 on the computer screen 12. Additional keyboard keystroke commands 34 are then used to display a message 18 to a user in the text display window 20.

For example, the following keyboard keystroke commands 34 can be sent by the peripheral device 22 to the host computer 14 to display the message "HELLO" to a user in text display window 20: <Windows> <R> <E> <D> <I> <T> <Enter> <H> <E> <L> <L><O> <Enter>. In another example, a notepad text editor is opened and is also used to display text messages 18 by sending the following keyboard keystroke commands <n><o><t><e><p><a><d> after initiating the command prompt. There are other Operating System (O/S) features that can also support text display, all of which are encompassed here.

In one embodiment, the host computer 14 is connected to the Internet 21. In this configuration, the keyboard keystroke commands 34 can also be used to access web pages simply by entering a Uniform Resource Locator (URL) from the opened command line interface. Sending keyboard keystroke commands 34 in a particular sequence automatically cause the host computer 14 to launch a default Web browser and access an identified website. An example, sequence is as follows: <Windows Key> <R> <W> <W> <W> <.> <C> <Y><P> <R> <E> <S> <S> <.> <C> <O> <M> <Enter>. Of course, any Internet website can be accessed.

The website address can be used to access any webpage within a website. For example, the web address sent in the keyboard keystroke commands 34 may access a webpage on a website containing specific information relating to peripheral device 22. For example, the webpage may contain instructions on how to install and operate the peripheral device 22.

The web browser can be Microsoft® Internet Explorer®, Netscape® Navigators, or any other browser the user has been installed on the host computer 14 and configured as the default. Alternatively, rather than entering an Uniform Resource Locator (URL), the keyboard keystroke commands 34 can contain an IP address that result in the same webpage being displayed on host computer 12. This process can be used to enable a user of any internet-connected host computer 14 to be automatically taken to a webpage. The webpage can contain step-by-step instructions, or an installation utility which could be downloaded and installed with minimal user intervention.

Figure 2:
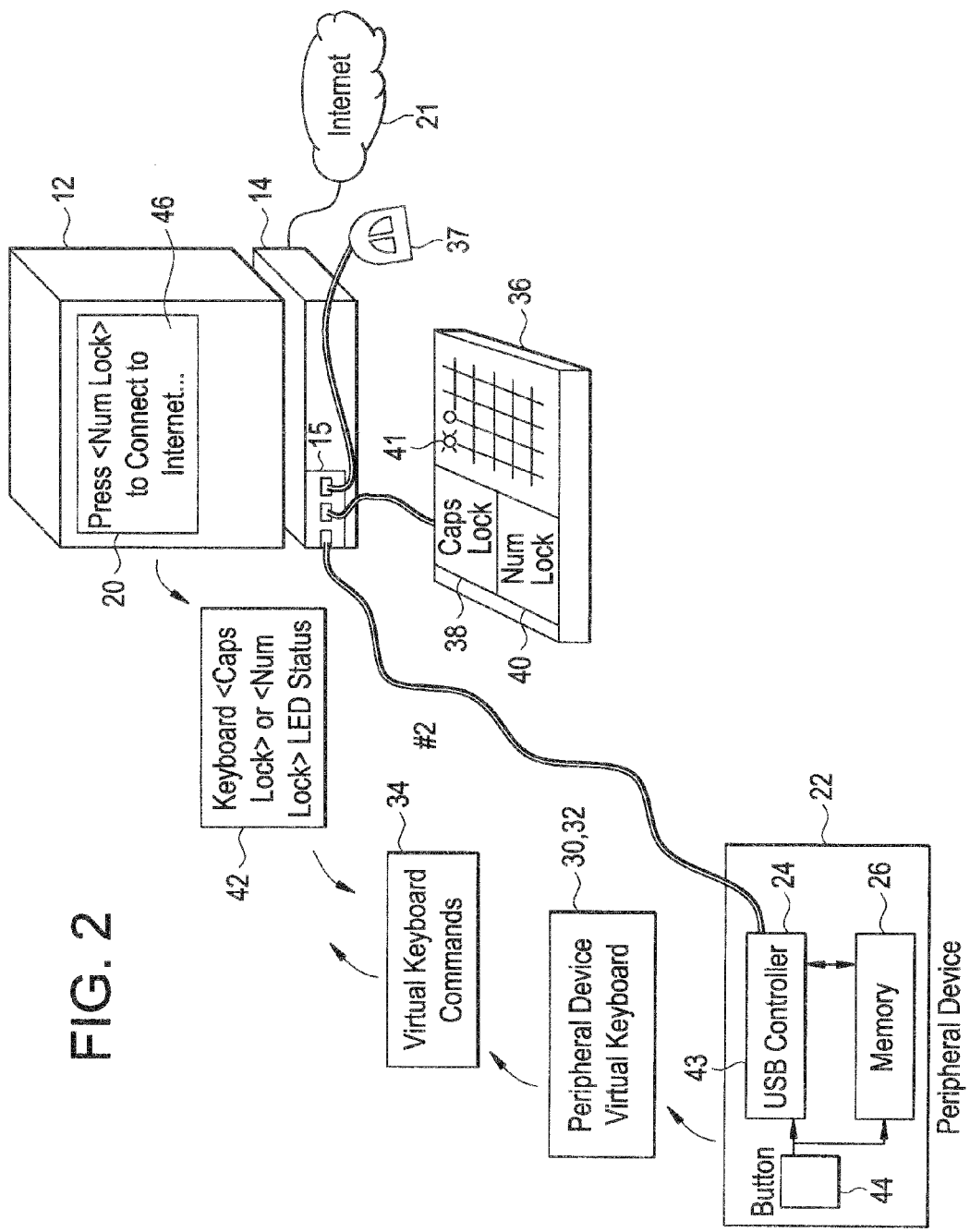
FIG. 2 is a diagram of the communication system that uses keyboard status signals for communicating back to the peripheral device.

FIG. 2 shows another embodiment where virtual keyboard keystroke commands 34 are used by the peripheral device 22 in conjunction with commands generated by an actual keyboard 36. The keyboard 36 is a conventional keyboard that, in this example, is connected to host computer 14 through one of multiple USB ports 15. Another one of the USB ports 15 is connected to the peripheral device 22 and another USB port 15 is connected to a USB mouse 37. One or more or the peripheral devices 22, 36 and 37 may be connected to the host computer 14 through interfaces other than USB ports, such as other types of serial cables, parallel signal cables, or wireless connections.

In some instances, the peripheral device 22 may not have any user input, such as a button. Alternatively, the peripheral device 22 may have one or more buttons 44. However, it may be desirable not to have the user press button 44. In either case, the keyboard 36 is used to convey information back to the user of peripheral device 22.

Pressing any one of keys <Caps Lock> 38, <Num Lock> 40, or <Scroll Lock> (not shown) on keyboard 36 causes the host computer 14 to send a keyboard status message 42 back to a keyboard interface. The keyboard status message 42 is usually used for changing the state of a Light Emitting Diode (LED) that corresponds with pressing one of the <Caps Lock> 38, <Num Lock> 40, or <Scroll Lock> keys on keyboard 36. For example, pressing the <Caps Lock> key 38 causes the host computer 14 to send a message 42 to the keyboard 36 that activates a Caps Lock LED 41. If a user pressed the <Caps Lock> key 38 again, the host computer 14 would send another message 42 to the keyboard 36 deactivating the Caps Lock LED 41.

The keyboard status message 42 is used by the peripheral device 22 to interpret user selections from a menu of options 46 displayed on the host computer 14. Thus, the computer screen 12 of the host computer 14 operates as a virtual user interface for the peripheral device 22 and the keyboard 36 operates as a user input device for the peripheral device 22.

Figure 3:
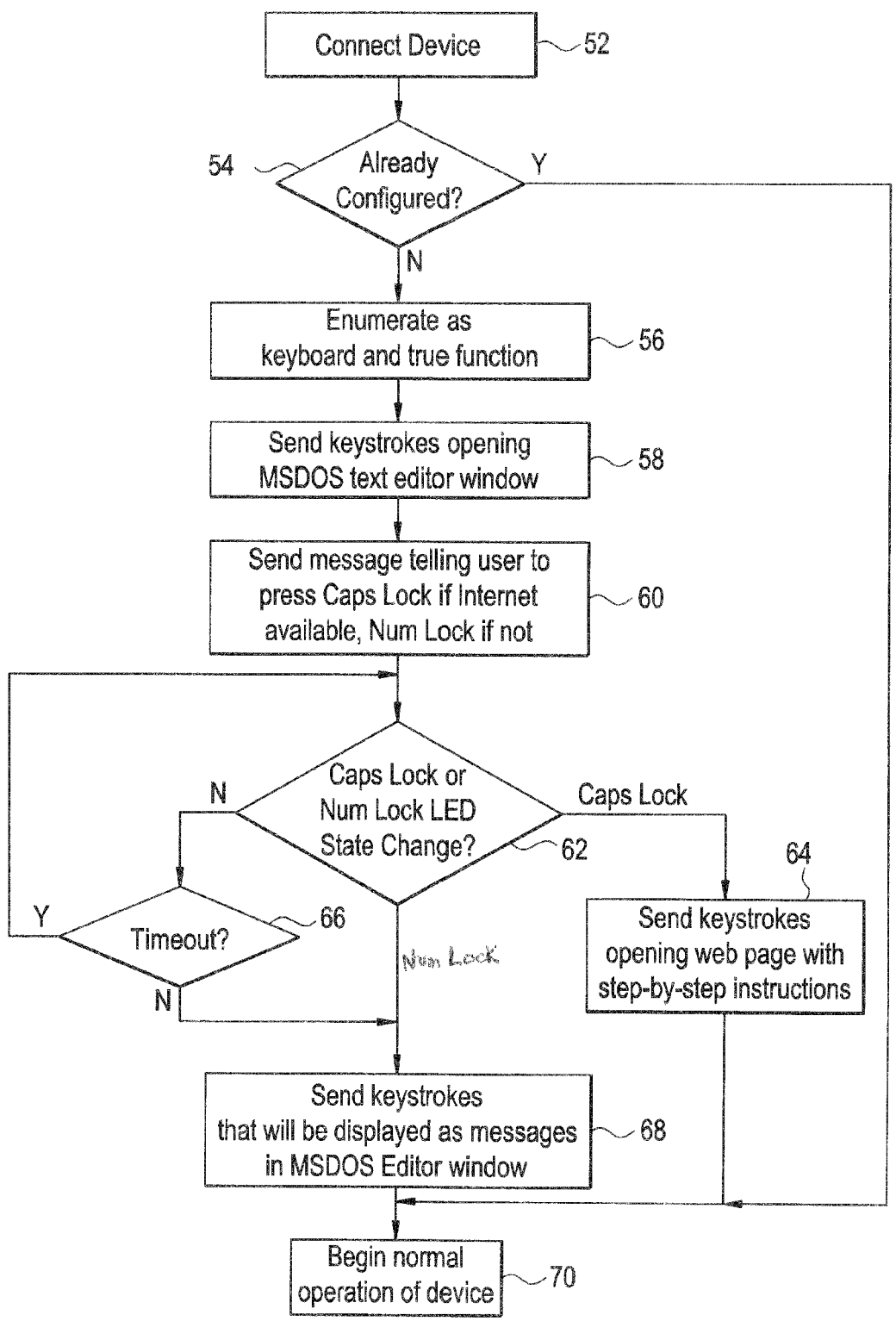
FIG. 3 is a flow diagram showing how the communication system in FIG. 2 operates.

FIG. 3 describes in more detail the system in FIG. 2. In block 52, the peripheral device 22 is connected to host computer 14 for the first time. In block 54, data contained in non-volatile memory 26 in the peripheral device 22 indicates to USB controller 24 that this is the first installation. In subsequent installations on new host computers it may be necessary to press a reset button 44.

In block 56, the peripheral device 22 enumerates as both a keyboard and as the true function of the peripheral device 22 as shown by USB signaling 30 and 32 in FIG. 2. In block 58, the peripheral device 22 sends a sequence of simulated keyboard keystroke commands 34 (FIG. 2) over the virtual keyboard interface of the USB connection that opens a text editor window 20 in host computer 14. In block 60, the peripheral device 22 sends additional keyboard keystroke commands 34 that display a message 46 telling the user to press a <Num Lock> button 40 on keyboard 36 if the user wants to connect to the Internet 21, or press the <Caps Lock> key 38 on keyboard 36 if an Internet connection is not available.

In block 66, the peripheral device 22 waits until it receives a USB OUT packet 42 from the host computer 14 over the virtual keyboard interface containing an instruction to change the state of either a <Caps Lock> or <Num Lock> LED. The peripheral device 22 does not actually have to have these LEDs, but it declares to the host computer 14 that it has these LEDs during USB enumeration 30. This causes the host computer 14 to send the OUT packet 42 any time the status changes for the LED 41 associated with the <Caps Lock> key 38 or for LED (not shown) associated with the <Num Lock> key 40. In other words, an associated OUT packet 42 is sent any time the <Caps Lock> key 38 or <Num Lock> key 40 is pressed.

If the <Num Lock> key 40 is pressed in block 62, the peripheral device 22 detects an OUT packet 42 from host computer 14 intended to change the state of a Num Lock LED. In response to the OUT packet 42, the peripheral device 22 sends a sequence of keyboard keystroke commands 34 causing the host computer 14 to open its default browser and go to a webpage associated with the manufacture of the peripheral device 22. The webpage may, for example, contain installation instructions for the peripheral device 22. The user can then proceed with installation, interacting with the UI of the webpage using the mouse 37.

Pressing the <Caps Lock> key 38 in block 62 causes the host computer 14 to generate an OUT packet 42 intended to change the state of the <Caps Lock> LED 41 on keyboard 36. Since the peripheral device 22 is enumerated with a keyboard interface, the peripheral device 22 receives the OUT packet 42 and determines the packet 42 is associated with key press of the <Caps Lock> key 38 on keyboards 36. Accordingly, the peripheral device 22 sends a sequence of keyboard keystroke commands 34 (FIG. 2) in block 68 that contain actual user instructions.

The user selects from options displayed on the screen 12, or indicates completion of a user activity prompted by the instructions displayed on screen 12 by possibly pressing another <Caps Lock> key 38, <Num Lock> key 40 or <Scroll Lock> key (not shown) on keyboard 36. At the end of the installation process, the peripheral device 22 may send an <ALT> <F> <X> keyboard keystroke sequence 34 to close the text editor window 20.

Wireless Binding

Figure 4:
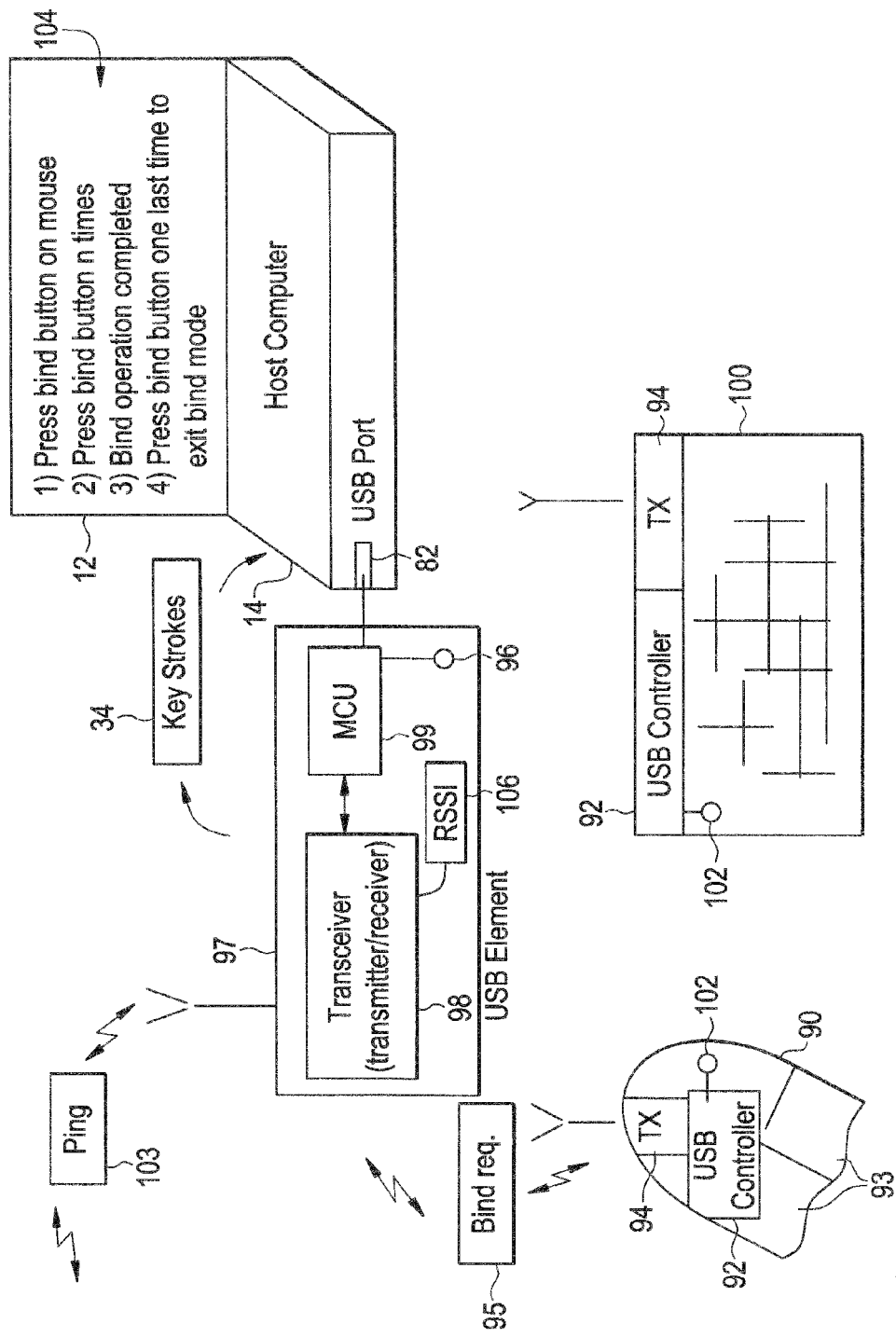
FIG. 4 is a diagram showing a wireless communication system.

FIG. 4 shows another application used for binding a transmitter with a receiver in a one-way wireless communication system. This example is described in the context of a wireless mouse 90 and a wireless keyboard 100. However, any wireless computer peripheral can be used in the same way, and other applications are described below as alternative embodiments.

A USB element 97 includes a USB microcontroller (MCU) 99 that is coupled to a USB port 82 on host computer 14. In an alternative implementation, the function of the USB MCU 99 may be implemented using an ASIC or other logic device located within the host computer 14. A transceiver 98 in the USB element 97 is capable of operating as both a receiver during a normal operating mode and has the optional capability of operating part time as a transmitter during a binding mode.

Both the wireless mouse 90 and the wireless keyboard 100 have a Unique Identifier (UID), which is programmed at some point during the manufacture of the products. The mouse 90 and keyboard 100 each include a transmitter 94 that is controlled by a microcontroller 92. The transmitters 94 in devices 90 and 100 and the transceiver 98 in USB element 97 each can operate over a plurality of radio frequency channels.

A binding mode configures the transmitters 94 in peripheral devices 90 and 100 to operate on a same channel with the receiver 98 in USB element 97. The binding operation is intended to support a large number of similar wireless devices within the range of the radio transmitters 94. The mouse 90, keyboard 100, and USB element 97 provide some means for a user to place them each in the binding mode. In one implementation, this may be a dedicated button 102 on devices 90 and 100 and a button 96 on USB element 97. In other implementations, the binding mode may be initiated by a combination and/or sequence of activations of user controls on the peripheral device 90 or 100 that have other uses during normal operation.

Figure 5:
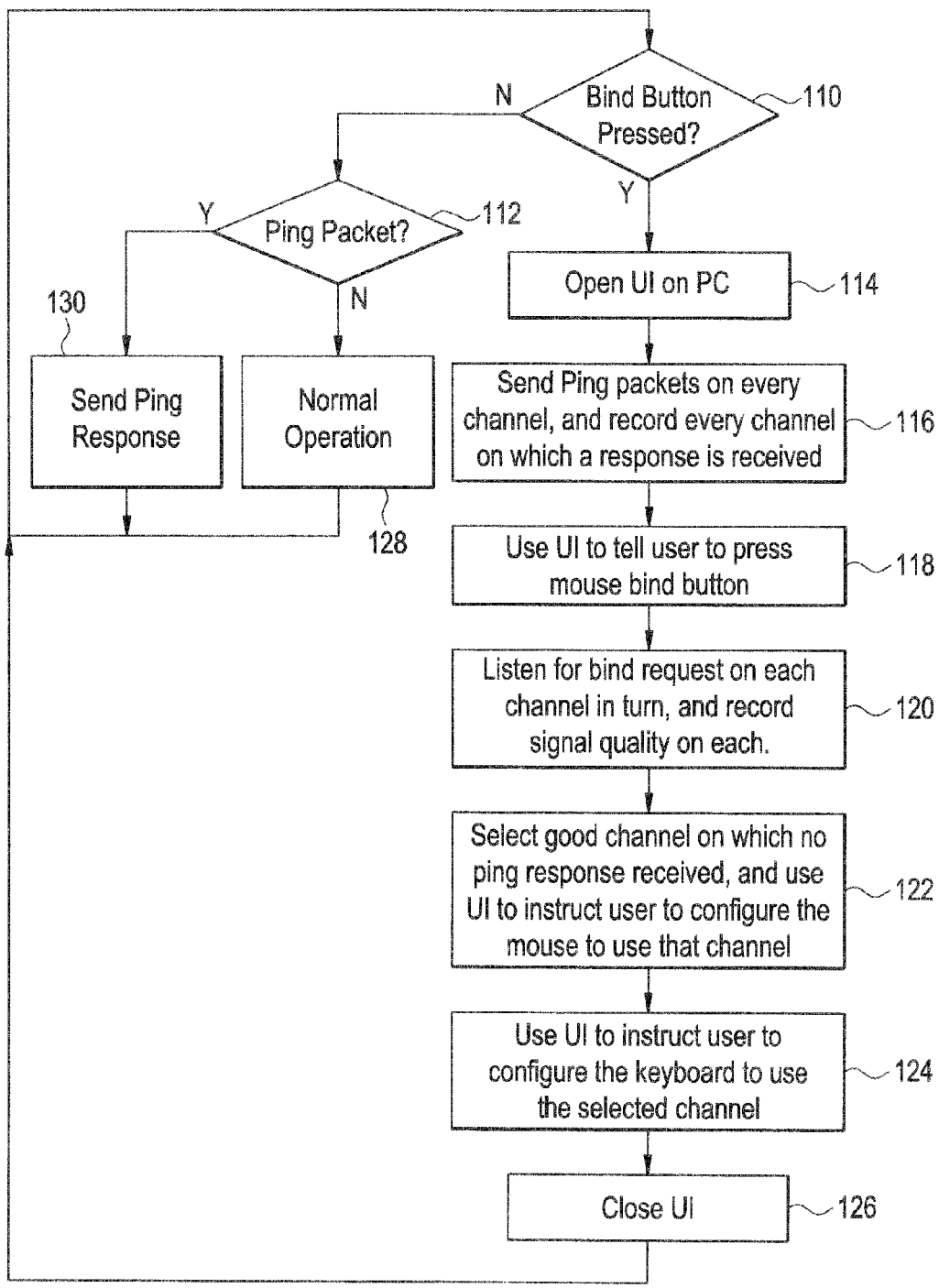
FIG. 5 is a diagram showing how the wireless communication system in FIG. 4 operates.

Referring to FIG. 5, in block 110, the USB element 97 operates in a normal operating mode when the bind button 96 (FIG. 4) is not pressed. In the normal operating mode, the USB element 97 is configured to receive radio signals on a single one of many available radio frequency channels. The MCU 99 is configured to receive mouse data packets, keyboard data packets, and "ping" packets in this normal operation mode. If the USB element 97 receives a mouse or keyboard data packet in block 112, it performs normal wireless USB operations in block 128 by converting the data into a USB packet format, and sending the data to the host computer 92 as a USB mouse or keyboard packet.

If the USB element 97 receives a "ping" packet in block 112, it will reconfigure the radio transceiver 98 into a transmit mode, and transmit a "ping response" packet 103 back to the wireless device sending the ping packet in block 130. The transceiver 98 then immediately transitions back into receive mode and resumes normal operation in block 128.

In block 110, when a user wishes to bind the mouse 90 or keyboard 100 to the USB element 97, the user first presses the "bind" button 96 on the USB element 97. In response, the USB element 97 activates an interactive user interface 104 on the host computer 14 in block 114, as described above in FIGS. 1-3. For example, the MCU 99 previously enumerated itself as a virtual keyboard. Pressing the bind button 96 causes the MCU 99 to send a set of keyboard keystroke commands 34 to the host computer 14 that open up a text display window on computer screen 12. Additional keystrokes 34 are then used to display instructions 104.

In block 116, the USB element 97 cycles through each radio channel, transmitting several "ping" packets 103 on each channel. The USB element 97 then listens for any returned ping packets 103 for a short period after each transmission. The MCU 99 keeps a record of each channel on which a ping response 103 is received and will not use any of these channels because they are already in use by another wireless system.

In block 118, the USB element 97 instructs the user through the keyboard keystroke commands 34 that are displayed on the UI 12, to press the bind button 102 on the mouse 90. Alternatively, the USB element 97 may instruct the user to start the bind mode by activating another mechanism, such as by pressing one of the mouse buttons 93. This causes the mouse 90 to rapidly cycle through all the channels, transmitting a "bind request" packet 95. The USB element 97 begins cycling through each channel in a receive mode. Each channel is cycled through sufficiently slowly so that the transmitter 94 in mouse 90 will transmit on each channel at least once while USB element 97 is on a channel, or until the USB element 97 has correctly received a "bind request" packet 95 on that channel.

In block 120, the USB element 97 keeps a record of each channel on which it did not receive a bind request packet 95. In some implementations, the receiver 98 calculates a measure of signal quality or some other measure of the reliability or quality of the wireless link for that channel. The USB element 97 may also store a measure of the link quality for each channel on which the bind request packet 95 is successfully received.

In block 122, using the information gained from the previous binding operations, the USB element 97 selects a channel on which no ping packet was received (not in use by another nearby wireless system) and was measured during the received bind request 95 as having good wireless link quality.

In block 124, the USB element 97 uses the UI 12 to provide instructions to the user to configure the mouse 90 to the selected channel. In one implementation, this may be achieved by pressing the bind button 102 a number of times corresponding with the channel selected by USB element 97. In another implementation, this may be achieved by pressing the bind button 102 once and then slowly moving the mouse 90, or pressing mouse buttons 93 a specified number of times, or rotating a scroll wheel.

The mouse 90 will transmit bind request packets 95 on a new channel each time one of the activities mentioned above is performed. For example, each time the mouse is moved 1 inch, the USB controller 92 may cause the transmitter 94 to transmit a bind request 95 on a next channel. Alternatively, each press of the bind button 102 causes the transmitter 94 to send another bind request packet 95 on a next channel.

During this sequencing through the radio channels, the USB element 97 listens on the selected channel. Once the USB element 97 receives a bind request packet 95 on the selected channel, it uses the keyboard keystroke commands 34 displayed on the UI 12 to tell the user to stop pressing the bind button 102, stop moving the mouse 90, stop rotating the scroll wheel, or stop whatever activity was used to cause the mouse 90 to select different channels. Or simply tells the user that the binding operation is completed. The USB element 97 then uses the UI 12 to instruct the user to perform some action that will cause the mouse 90 to exit the bind mode, such as pressing the bind button 102 one final time.

The mouse 90 then begins normal operation, transmitting wireless mouse data packets in response to mouse movements, button 93 presses, etc. The mouse 90 may automatically transmit normal data packets for a short period after the bind mode is exited in order to confirm to the USB element 97 that binding was successfully completed.

In block 124 of FIG. 5, the USB element 97 sends keyboard keystroke commands 34 to the UI 12 to instruct the user to place the keyboard 100 in bind mode. In one implementation this may be by using a bind button 102 on the keyboard 100. However, in an alternative implementation the user may be instructed to press a special combination of keys on the keyboard 100. For example, the user could press <ctrl> <alt> <num lock> on the keypad of keyboard 100 to start the binding operation.

The USB element 97 instructs the user via messages 104 on UI 12 to enter a selected channel number into the keyboard 100. The keyboard 100 transmits bind request packets 95 on the selected channel to allow the USB element 97 to confirm that the correct channel has been entered. The USB element 97 then sends keyboard keystroke commands 34 to the UI 12 that instruct the user to enter keystrokes or press button 102 on the keyboard 100 that causes the keyboard 100 to exit the bind mode. For example, the user may be directed to repeat the same combination of keystrokes used to enter the bind mode.

The keyboard 100 will then begin normal operation, transmitting wireless keyboard data packets in response to pressed keystrokes. The keyboard 100 may automatically transmit normal data packets for a short period after the bind mode is exited in order to confirm to the USB element 97 that binding was successfully completed. The USB element 97 will then use the UI 12 to inform the user that binding had been successfully completed and then will close the text window on the UI 12 in block 126. Binding is now complete, and the user can begin operating the wireless mouse 90 and wireless keyboard 100.

Post Binding Procedures

It is in the nature of wireless communications that interference may come and go. Interference that is not present or evident during binding may begin during normal operation. It is also possible that another similar wireless HID system may have been unpowered during the binding process. Thus, despite the operations described above, two wireless HID systems may find themselves operating on the same channel. This situation can be resolved by employing the following post-binding procedure.

Referring back to FIG. 4, each time the USB element 97 powers up, it can transmit a series of ping packets 103 on its normal operating channel. The USB element 97 then listens for a ping response packet for a short period after each transmission. A ping packet 103 returned to the USB element 97 means another wireless device is operating on the same channel. Accordingly, the newly powered USB element 97 will automatically re-initiate the binding sequence. It will do this by sending a series of keyboard keystroke commands 34 to the host computer 14 that are displayed on the UI 12. The keyboard commands 34 generate text on UI 12 informing the user that the currently selected wireless channel is no longer suitable for use. The binding process described above then begins again.

Similarly, the USB element 97 at some point during normal operation might start consistently receiving uncorrectable, corrupted data packets from the mouse 90 or keyboard 100. The USB element 97 would then automatically send keyboard commands 34 generating a message 104 on the UI 12 notifying the user that the binding process is being re-initiated.

In some cases, interference on a given channel may be so bad that not even corrupted data is received. Some radio receivers have a Received Signal Strength Indicator (RSSI) function 106. A USB element 97 with a radio that has the RSSI feature 106 may detect the presence of the interference signal by periodically checking the RSSI value during times when no data is being received from the mouse 90 or keyboard 100.

If the RSSI value is consistently high for a significant period of time when no mouse or keyboard data is being received, the USB element 97 may automatically re-initiate binding. If the radio 98 in the USB element 97 does not have such a feature, then the user can manually initiate binding by pressing the bind button 96 on the USB element 97. For example, the user may manually press the bind button 96 if moving the mouse 90 does not move a mouse pointer on the screen 12 on screen 12 or when pressing the keys on keyboard 100 are not recognized by the host computer 92.

The implementation described above is just one exemplary implementation. Many other implementations are possible employing a subset of the operations described, and offering any combination of the features described.

The exemplary implementations above are used with various versions of the Windows® operating system. Some HID manufacturers may support other operating systems such as Linux and MacOS. A driver can be written in various computer systems that recognize the Windows® key and emulate the behavior of Windows® in response to the keystrokes described above. If the packaging or instructions provided with a wireless product instruct Linux or Mac users to download such a driver from the manufacturer's website, this would also enable non-Windows users to use any peripheral implementing this invention.

The example in FIG. 4 describes a wireless keyboard 100 and a wireless mouse 90. However, the binding operation is intended to be used with any wireless computer peripheral that communicates with a host computer. A manufacturer may ship a wireless system pre-bound. In this case, the mouse 90 or keyboard 100 would work with the USB element 97 "out of the box" without having the user initiate binding. The bind operation described above would then only need to be activated if local conditions cause interference on the pre-bound channel, or when another mouse/keyboard system was operating nearby on the same channel.

Referring back to FIG. 2, the binding operation can also be applied to applications other than wireless peripherals. For example, in FIG. 2 a <Help> button 44 can be pressed when a user needs help configuring or using the peripheral device 22. For example, pressing the button 44 causes the peripheral device 22 to generate keyboard commands 34 that open up a webpage on a website that provides support for the peripheral device 22. The keyboard commands 34 can also take the user through a troubleshooting process.

Alternatively, pressing the button 44 causes the peripheral device 22 to send a <windows> key followed by <h> <enter> key keyboard commands 34 that launch the Windows Help service. The cursor is in the search term entry window after the help service is launched. The peripheral device 22 can therefore automatically send a series of keystrokes 34 comprising an appropriate search term, followed by <Enter>. Thus, pressing the Help button 44 on the peripheral device 22 automatically takes the user to an appropriate list of help topics.

Many wireless networking products allow the user to access a status and configuration interface by typing the IP address of the device. A typical 802.11b access point can be configured in this manner, for example the channel can be changed, the encryption settings adjusted, etc. The binding operation can also be implemented using button 102 on wireless peripheral device 90 or 100 (FIG. 4) that automatically opens a default web browser on the host computer 14. The wireless peripheral device then automatically enters the IP address of the configuration page taking the user to a configuration menu.

Referring still to FIG. 2, the binding operation can eliminate the need to ship a Compact Disc (CD) with drivers along with the USB peripheral device 22 when Windows® does not have built-in drivers for the peripheral device 22. On first connection, or in response to pressing an "install" button 44, the peripheral device 22 enumerates a keyboard interface. The peripheral device 22 then automatically takes the user to a website where drivers can be downloaded.

Figure 6:
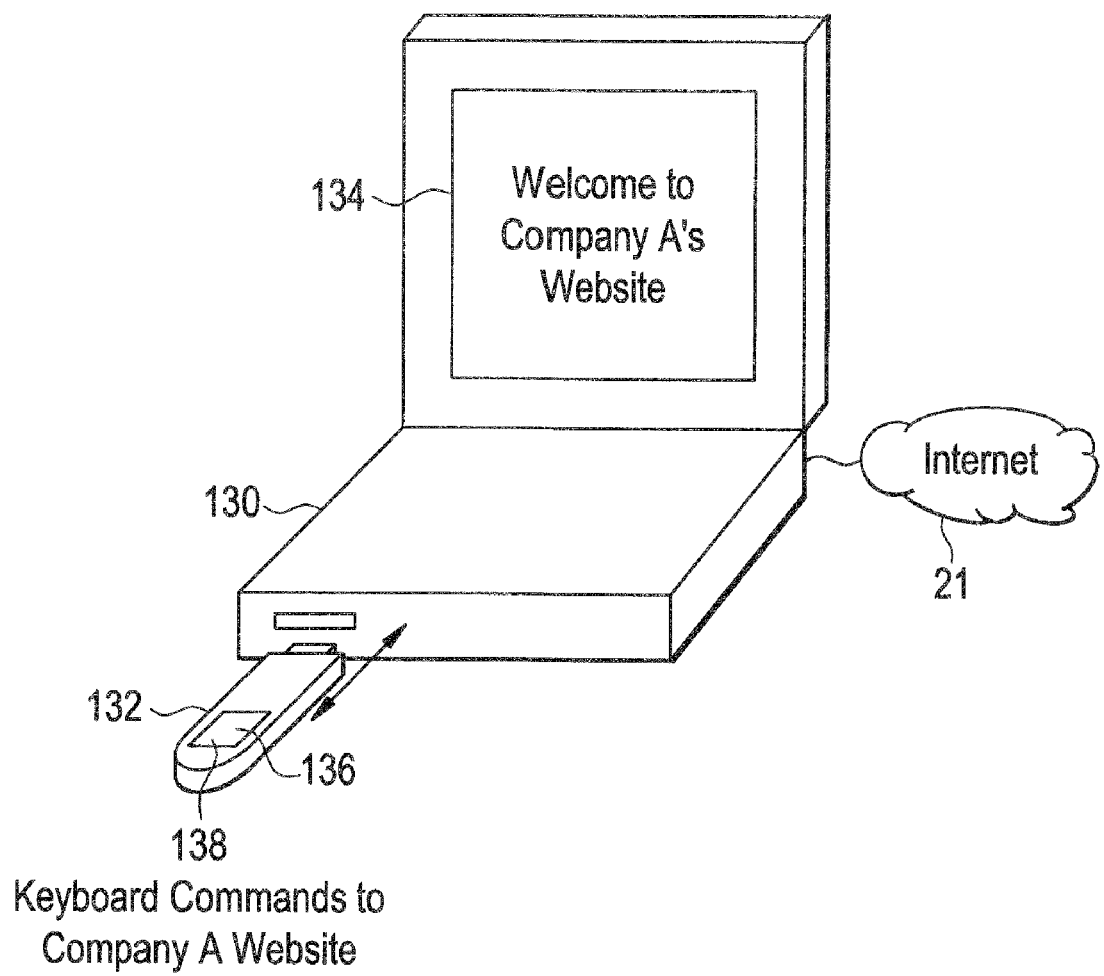
FIG. 6 is a diagram showing how a non-keyboard peripheral device sends keyboard keystroke commands.

FIG. 6 shows another embodiment where the virtual keyboard operation is used as a marketing tool. A small USB peripheral device 132 contains a USB MCU 136 that emulates a keyboard. As soon as the peripheral device 132 is plugged into the host computer 130, the MCU 136 automatically emulates a USB keyboard interface.

The MCU 136 then automatically generates a series of keyboard keystroke commands 138 that are stored in the MCU 136 that take the user to a company website 134. Alternatively, the keyboard keystroke commands 138 may open a text editor and type out business card information for a particular business or person.

The peripheral device 132 can be small enough to be carried on a keychain. There are many possible marketing and product promotional applications for device 132. For example, each different peripheral device 132 can be programmed with a unique serial number, and can be used to incentivize its use by containing a possible winning serial number for a prize draw.

The system described above automatically guides a user step-by-step through the binding process. Since the instructions are embedded inside the peripheral device, no printed instructions are needed. Therefore, peripheral device installation or reinstallation is just as easy years after it is purchased as the day of purchase. Moreover, binding multiple wireless devices is just as easy as binding a single wireless device.

The binding operations above support radio systems that use a large number of available channels, and automatically determine whether or not radio performance on a given channel is acceptable. The binding operations also automatically detects the presence of transient interference or other systems using the same channel and then guides a user through another re-binding process. These binding operations may dramatically reduce the number of product returns and support calls for wireless HID products.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A computer element, comprising: a peripheral device that is not a computer keyboard but that is configured to represent itself to a host computer as having both a keyboard function and a non-keyboard computer peripheral function;
    wherein the peripheral device is configured to generate one or more keyboard keystroke commands comprising display commands to display one or more selectable options on the host computer,
    and wherein the peripheral device is configured to receive a keyboard status message from the host computer broadcast to devices represented to the host computer as having a keyboard function in response to an action on a keyboard status key of the host computer and, based on receipt of the keyboard status message, interpret the keyboard status message as a selection of at least one of the selectable options.

2. The computer element according to claim 1, wherein the one or more keyboard keystroke commands further comprise command line interface commands to open a command line interface and to initiate a software application of the host computer from the command line interface.

3. The computer element according to claim 1, wherein the peripheral device comprises a radio communicatively linked to the host computer.

4. The computer element according to claim 3, wherein the one or more keyboard keystroke commands further comprise command line interface commands to open a text editor or webpage on the host computer describing how to bind the radio with a wireless transmitter.

5. The computer element according to claim 4, wherein the one or more keyboard keystroke commands are configured to direct a user to activate a device on the wireless transmitter to establish a correspondence with one of a plurality of radio channels selected by the radio.

6. The computer element according to claim 1, wherein the keyboard status message is a <Caps Lock> state indicator, a <Num Lock> state indicator, or a <Scroll Lock> state indicator.

7. The computer element according to claim 1, wherein the peripheral device sends the one or more keyboard keystroke commands when:
    another device is using a same wireless channel as the peripheral device;
    corrupted data is received from an associated transmitting device; or
    there is an absence of a received data transmission from the associated transmitting device but a high level of Radio Frequency (RF) energy is detected on a currently used radio channel.

8. The computer element according to claim 1, wherein the peripheral device is a non-keyboard Universal Serial Bus (USB) device.

9. A method comprising:
    representing, to a host computer, a non-keyboard peripheral device as including a keyboard function;
    sending, from the non-keyboard peripheral device to the host computer, a sequence of keystroke commands to display information on a screen of the host computer;
    receiving, by the non-keyboard peripheral device in response to a key press of a keyboard status key on a keyboard, a keyboard status message, the keyboard status message broadcasted from the host computer to devices represented to the host computer as having a keyboard function; and
    using, by the non-keyboard peripheral device, the keyboard status message to interpret one or more selectable options associated with operating the non-keyboard peripheral device, wherein to interpret comprises determining that the keyboard status message represents a selection of one or more of the options.

10. The method of claim 9, further comprising sending, from the non-keyboard peripheral device to the host computer, a sequence of keyboard keystroke commands to display on a screen of the host computer selectable options that include the one or more selectable options.

11. The method of claim 10, further comprising displaying, on the screen of the host computer, a web page according to the sequence of keyboard keystroke commands.

12. The method of claim 1, further comprising operating a screen of the host computer as a virtual user interface for the non-keyboard peripheral device, and operating the keyboard as a user input device for the non-keyboard peripheral device.

13. The method of claim 9, further comprising enumerating the non-keyboard peripheral device as a USB composite device, one of a plurality of enumerated interfaces of the composite device being a keyboard interface.

14. A method comprising:
representing a non-keyboard peripheral device as including a keyboard function;
providing keyboard keystroke commands in the non-keyboard peripheral device that simulate keyboard keystroke commands;
sending the keyboard keystroke commands to a host computer that cause the host computer to display information as if it were received from a keyboard,
wherein to display information comprises displaying selectable options on the host computer for operating the non-keyboard peripheral device;
identifying keys for selecting the selectable options that, when pressed on an associated keyboard communicatively linked with the host computer, cause the host computer to broadcast an associated keyboard status message to devices represented, to the host computer, as having a keyboard function;
identifying a keyboard status message received from the host computer by the non-keyboard peripheral device as an action on one of the keys intended to select at least one selectable option of the selectable options;
utilizing the keyboard status message from the host computer to identify at least one selected option of the selectable options; and
operating the non-keyboard peripheral device according to the at least one selected option.

15. The method according to claim 14 further comprising using the keyboard keystroke commands to open a web browser on the host computer and then access a web page.

16. The method according to claim 14, further comprising using the keyboard keystroke commands provided to instruct a user how to bind the non-keyboard peripheral device with a wireless transmitter.

17. The method according to claim 14, wherein identifying keys comprises identifying one or more of: a <Caps Lock> key, a <Num Lock> key, and a <Scroll Lock> key for selection of the at least one selected option on the associated keyboard.

18. A method comprising:
representing a non-keyboard peripheral device to a host device as having both a keyboard function and a non-keyboard function; and
using a command message from the non-keyboard peripheral device in conjunction with a keyboard status message generated by a keyboard device in response to depression of a keyboard status key of the keyboard device, wherein the keyboard device is associated with the host device, and wherein the using comprises:
sending the command message from the non-keyboard peripheral device to the host device, wherein the command message comprises one or more keyboard keystroke commands to display selectable options on a display of the host device;
receiving, from the host device, the keyboard status message on the non-keyboard peripheral device; and
interpreting, on the non-keyboard peripheral device, the status message as at least one option selection of the selectable options.

19. The method of claim 18, further comprising performing an operation of the non-keyboard peripheral device according to the at least one option selection.

20. The method of claim 18, further comprising one or both of:
operating the display of the host computing device as a virtual user interface for the non-keyboard peripheral device, or
operating the keyboard device as a user input device for the non-keyboard peripheral device.

21. The method of claim 18, further comprising enumerating the non-keyboard peripheral device as a USB composite device, one of a plurality of enumerated interfaces of the composite device being a keyboard interface.

22. The method of claim 18, wherein the one or more keyboard keystroke commands displays a message on the display of the host computing device identifying the individual key as corresponding to the at least one option selection.

* * * * *

UNITED STATES PATENT AND TRADEMARK OFFICE
CERTIFICATE OF CORRECTION

PATENT NO. : 7,629,963 B1
APPLICATION NO. : 11/007072
DATED : December 8, 2009
INVENTOR(S) : David G. Wright Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Second Day of November, 2010

David J. Kappos
*Director of the United States Patent and Trademark Office*